US005513749A

United States Patent [19]

Simmons

[11] Patent Number: 5,513,749
[45] Date of Patent: May 7, 1996

[54] STORAGE CASE FOR MULTIPLE COMPACT DISCS

[76] Inventor: Charles B. Simmons, 19204 Coslin Ave., Carson, Calif. 90746

[21] Appl. No.: 439,494

[22] Filed: May 11, 1995

[51] Int. Cl.⁶ .................................................. B65D 85/57
[52] U.S. Cl. ...................................... 206/308.1; 206/313
[58] Field of Search .................................. 206/307.1, 307, 206/308.1, 308.3, 309, 310, 311, 312, 313

[56] References Cited

U.S. PATENT DOCUMENTS

| | | |
|---|---|---|
| 4,874,085 | 11/1989 | Grobecker et al. . |
| 5,078,270 | 1/1992 | Campbell .............................. 206/308.1 |
| 5,246,107 | 9/1993 | Long et al. ......................... 206/308.1 X |
| 5,284,243 | 2/1994 | Gelardi et al. . |
| 5,284,248 | 2/1994 | Dunker . |
| 5,285,893 | 2/1994 | Misterka et al. ..................... 206/313 X |
| 5,307,926 | 5/1994 | Mee ..................................... 206/309 X |
| 5,310,054 | 5/1994 | Stumpff et al. ....................... 206/309 X |
| 5,370,224 | 12/1994 | Karakane et al. . |
| 5,477,960 | 12/1995 | Chen .................................... 206/308.1 |

Primary Examiner—Jacob K. Ackun

[57] ABSTRACT

A storage case for holding approximately five compact discs (CDs) which is approximately equal in exterior dimensions to that of a standard jewel case of the type most widely used in the U.S. for holding a single CD. The invention addresses both a factory manufactured case, and components for modifying an existing standard CD jewel case. The rectangular case is properly dimensioned and shaped to cooperatively function with the most common currently available and widely used CD jewel case storage racks and boxes. The case includes rigidly structured top and bottom case halves hingedly attached to one another for allowing relative pivotal movement for opening and closing the case. A binder member removably snaps into the interior of the bottom half adjacent the hinge side. The binder member includes multiple extensions for retaining five preferably clear plastic flexible sleeves that retain a CD each. The sleeves include apertures along one edge for receipt and retention by the binder member extensions, and can be flipped through similar to pages of a book when the case is open. Insert card that describe the contents of the case are provided for identifying the contents of the case when closed and stored in a case storage device. The case allows five CDs to be stored in the space taken up by a typical single CD jewel case, thus allowing CD collections to be compressed to ⅕ their previous size.

3 Claims, 10 Drawing Sheets

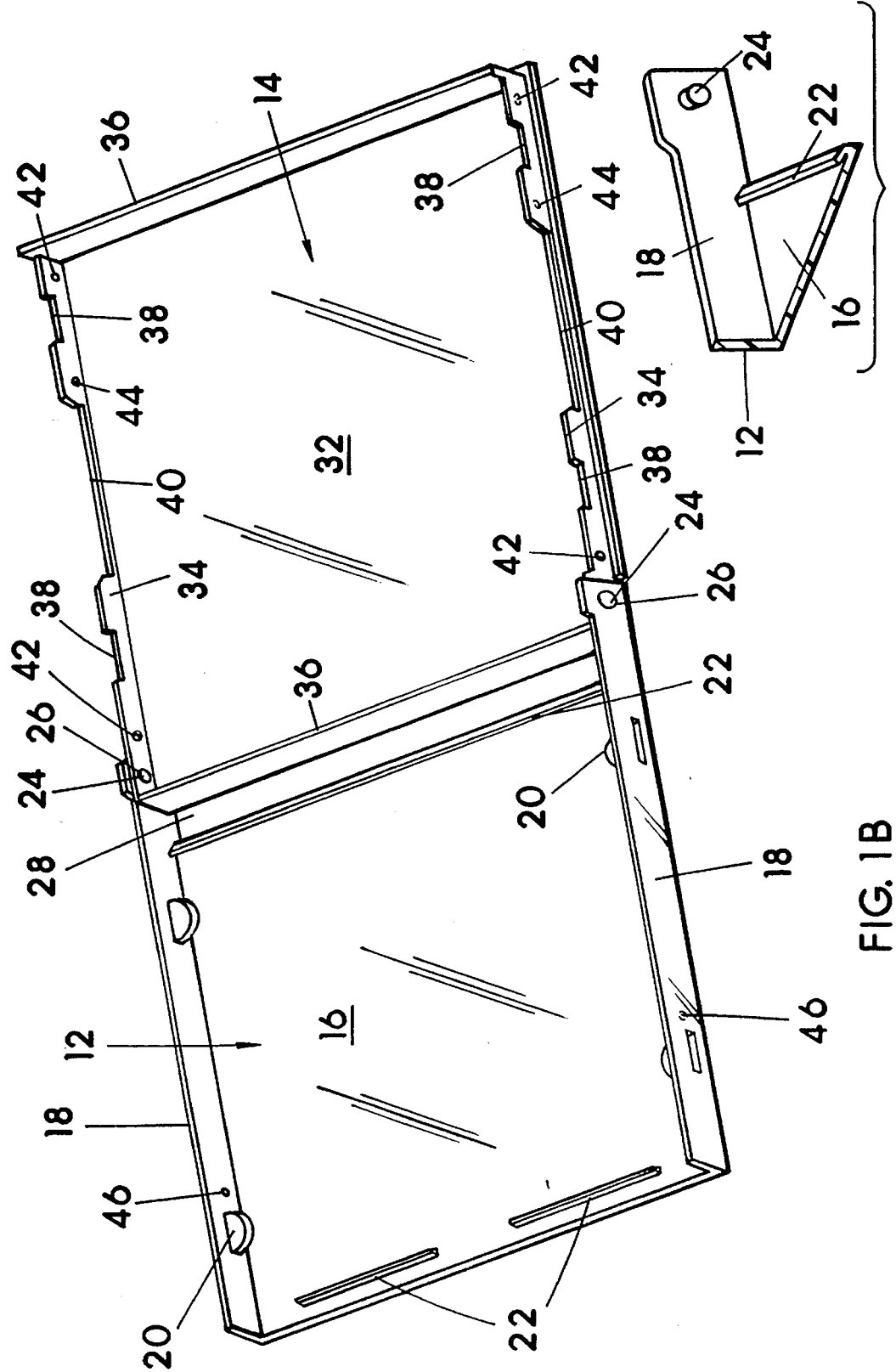

STORAGE CASE FOR MULTIPLE COMPACT DISCS

BACKGROUND OF THE INVENTION

1. Field of the Invention

This invention relates to cases for protectively storing information-bearing compact discs commonly known as CDs, and more precisely to a hard or rigid storage case openable via hinged pivotal case halves, and which is structured for storing multiple CDs in a compact space stacked one upon the other within the case and in protective sleeves which may be flipped and thus browsed through similar to pages of a book.

2. Description of the Related Prior Art

There is an increasing demand on the part of the CD consumer, producer, and retailer for efficient storage of multiple CDs in a compact case. For the consumer, finding adequate storage space for ever increasing CD collections is seen as a significant problem. It has been estimated that the average CD consumer in the U.S. currently owns well over 100 CDs. This number will likely rise significantly in the future due to increased availability and sales of music CDs, CD-ROMs, Photo CDs, recordable CDs and CD video discs. The "standard" or typical CD storage case currently in use in the U.S. is referred to as the jewel case or jewel box, and is designed to hold a single CD and a paper booklet providing information related to the contained CD. The depth of the standard jewel case is more than seven times the thickness of a single CD, and this is seen as significant unwarranted waste of space.

For the CD producer, there is considerable motivation to decrease packaging and distribution costs. Distributing CDs in multi-disc packages is an increasingly common way to lower such costs. It is also becoming a very popular way to market CDs. For the CD retailer, there is the problem of limited shelf space. In order to maximize product offerings, there is increasing demand for smaller packaging size, and a push for conformance to the standard jewel case. Studies have shown that CD consumers and retailers have and will continue to prefer jewel case storage over alternatives such as cardboard envelopes, plastic sleeves, and other plastic cases. For the consumer this preference is due to the rigidity of the jewel case and thus the superior protection provided to the CD and paper contents, the ease of browsing collections by viewing the case title spine, the familiarity of how the case operates, and the wide availability of replacement cases. Additionally there are currently many CD jewel case storage racks and cases in use for holding, storing and displaying large numbers of the typical or "standard" single CD jewel cases, and any significant deviation from the "standard" CD jewel case will render these jewel case storage systems unusable by those who are currently using them. For the retailer, there is strong desire for long term jewel case compliance since their display shelves, security devices, etc. are usually designed specifically for such cases. However, nearly all of the prior art storage cases for holding multiple CDs differ in size and structure from the standard jewel case. Those that do conform to the jewel case standard can only store a maximum of two CDs. What is clearly needed is a structure that allows storage of many (more than two) CDs in a case which is consistent in size and structure with the standard jewel case. Unfortunately, there is no available prior art that satisfies this need. The present invention allows the storage of up to five CDs in a standard jewel case structure. It also provides many additional benefits over the prior art. Although there are prior art CD storage cases and devices for holding multiple CDs, none are structured the same nor do they offer all of the benefits of the present invention.

Related known prior art includes U.S. Pat. No. 4,874,085 issued Oct. 17, 1989 to H. Grobecker et al in which a CD storage case for holding a single CD is taught. It is believed the Grobecker et al patent teaches the basic structure which is currently the industry standard or typical single CD storage case comprising most all rigidly structured hinged-lid single CD storage cases sold in the U.S. The Grobecker et al case is believed to be the case in which new single CDs are shipped and sold, at least those CDs sold in the U.S. in a hinged lid protective storage case. This is also believed to be the case which CD jewel case storage racks and boxes and the like are designed to store.

Another related prior art device is taught in U.S. Pat. No. 5,370,224 issued Dec. 6, 1994 to T. Karakane et al teaching a multiple CD storage case utilizing multiple individual CD holding sleeves or jackets, with each sleeve pivotally fastened at one corner within a protective case. The T. Karakane et al is not believed to be structured and sized compatible with most of the currently used jewel case storage racks and boxes in the U.S., and it is not structured the same as the present invention.

Another related prior art device is taught in U.S. Pat. No. 5,284,243 issued Feb. 8, 1994 to A. L. Gelardi et al teaching a "standard" hinged lid CD storage case of the type most widely used in the U.S. which is modified in the interior to include a pivotal interior rigid insert for supporting a CD on each oppositely disposed side of the pivotal insert. This CD storage case appears to be one which meets the current exterior requirements of conventional CD jewel case storage racks and jewel case storage systems, but because it is structured to hold a maximum of two CDs, it is not considered an adequate solution to the current CD storage and protection problems heretofore detailed. It also does not address significant problems found in existing jewel cases, such as discs coming loose from center hub, breaking of teeth of center hub, difficulty of removing CD from center hub, and scratching of discs on center hub upon insertion or removal.

Yet another relevant prior art device is taught in U.S. Pat. No. 5,284,248, issued to P. Dunker on Feb. 8, 1994. Dunker's "storage case and a disc holding part for storage cases for round data discs" includes a base part and a lid which are pivotally connected along a common edge by a hinge device. The disc holding part and the base are pivotally connected by a second hinge device. The disc holding part is structured for holding two discs. Since the Dunker device is only structured to hold a maximum of two CDs, it is also not considered an adequate solution to the current CD storage and protection problems heretofore detailed.

SUMMARY OF THE INVENTION

The following summary and descriptions are of a best mode for carrying out the invention, and there are clearly changes which could be made to that which is specifically herein described and shown in the included drawings, but for the sake of briefness of this disclosure, all of these changes which fall within the scope of the present invention have not herein been detailed. The present invention is a storage case structured to hold multiple compact discs (CDs), and preferably approximately five CDs. The case is approximately equal in exterior dimensions and shape to that of a "standard" jewel case of the type currently most widely available and used in the U.S. to hold a single CD. The present invention addresses both a factory manufactured complete case for holding five CDs, and components to allow modifying an existing CD jewel case of the type originally designed to hold only a single CD. In retro-fitting, the consumer would be able to purchase components to quickly, easy, and inexpensively modify standard jewel cases he already owns, converting them from single or possibly a two CD storage case such as the A. L. Gelardi et al case to one in accordance with the present invention and capable of holding approximately five CDs. Whether the present case is completed in the factory and then sold, or whether the case is retro-fitted by the consumer, the end result is a CD jewel case capable of holding approximately five CDs which will also fit and store in the currently available and widely used CD jewel case storage racks, boxes, display racks and the like, and a jewel case which is familiar in appearance and operation to current CD owners.

The present case includes rigidly constructed top and bottom covers or halves, although the term half or halves in this disclosure does not means precisely 50% of the case in either the top or bottom cover. Also included is a hinge arrangement connecting the top and bottom covers allowing relative pivotal movement between the two members. Also included is a binder member that snaps into the bottom cover of the case adjacent the hinge side of the case. The connection of the binder member in the bottom cover is preferably a connection which allows disconnection by the user, the reasoning therefore to become appreciated with continued reading. The present case further includes up to five preferably clear plastic flexible sleeves that can hold at least one CD each, and attach to the binder member. In addition, a paper insert and a liner card that describe the contents of the case are provided for identifying the contents of the case absent requiring the opening the case or the removal thereof from a typical storage rack or box of the type wherein only the jewel case spine is exposed.

Advantages of the present invention include the allowing of approximately five CDs to be stored in the space taken up by a "standard" CD jewel box, thus allowing CD collections to be compressed to 1/5 their existing size. Since the present case utilizes the exterior dimensions of the "standard" CD jewel case, it can be used with any storage rack or container designed for such "standard" jewel cases. The present case allows more economical storage of CDs over using standard jewel boxes as well as protected, compact transport when taking CDs on the road. The title labels of the CDs contained can be displayed in the jewel case front booklet window. The titles of the CDs can be written and viewed on the jewel case spine, thus allowing browsing of the contents without pulling the jewel case out of storage rack or case. Each CD is protected by the individual flexible sleeves which are preferably made of transparent plastics, and which is further protected by the rigidity of the case. The CDs are displayed within the case similar to book pages, so that upon opening the case, the individual CDs can be easily browsed. The plastic sleeves can be easily inserted or removed from the jewel case when desired, although it is not necessary to remove a sleeve in order to remove a CD from the case. Manufacturing cost savings may be achieved by using or purchasing the top and bottom covers of the currently mass produced "standard" CD jewel case. The present case can accommodate a typical CD booklet, depending upon the thickness of the booklet, if one or more sleeves are removed. If the booklet is unusually thin, the case can accommodate five CDs and the thin booklet. The case can also be configured to hold from one to several CDs accompanied with a very thick booklet. This booklet can be even thicker than the existing single jewel case will allow. The present case allows multiple CDs by a single artist to be grouped into one jewel case for added convenience in finding the desired CD by that artist. The present case can be used to distribute multi-CD sets in a single box that conforms to the current jewel box packaging and display standards. The case binder insert allows conversion of existing stocks of jewel cases from single disc to multi disc, as needed by suppliers. The binder insert can also be used to convert existing stocks of standard dual-size CD jewel cases to store up to approximately ten CDs. These "dual-size" CD jewel cases are structured very similar to the standard jewel case for holding a single CD, only the "dual-size" jewel case is about twice as deep and is structured to hold one or two hinged rigid disc holding trays like the trays of the A. L. Gelardi et al patent described above, so that the "dual-size" jewel case will hold between 1 and 4 CDs, but it is also twice as thick as the standard single CD jewel case so it takes twice the storage space.

The present case also eliminates significant problems found in prior art single and multi-CD jewel cases, such as discs coming loose from center hub, breaking of teeth of center hub, difficulty of removing CD from center hub, and scratching of discs on center hub upon insertion or removal.

Variations to the present case (invention) are possible. For example, the present CD case does not have to be identical but should be equivalent in exterior size and shape to current standard jewel cases so it will cooperatively function with standard jewel case storage devices. The number of sleeves stored is not restricted to five, it could be more or less. The case top and bottom rigid covers may be clear or opaque, but are preferably clear for reading labels therethrough.

BRIEF DESCRIPTION OF THE DRAWINGS

FIG. 1B shows the "standard" prior art CD jewel case of FIG. 1A with the CD and the CD holding raised platform insert removed from the bottom half of the case.

FIG. 1C is a fragmentary view showing a component of the hinge utilized on the standard prior art jewel case.

DESCRIPTION OF THE PREFERRED EMBODIMENT

Figure 1A:
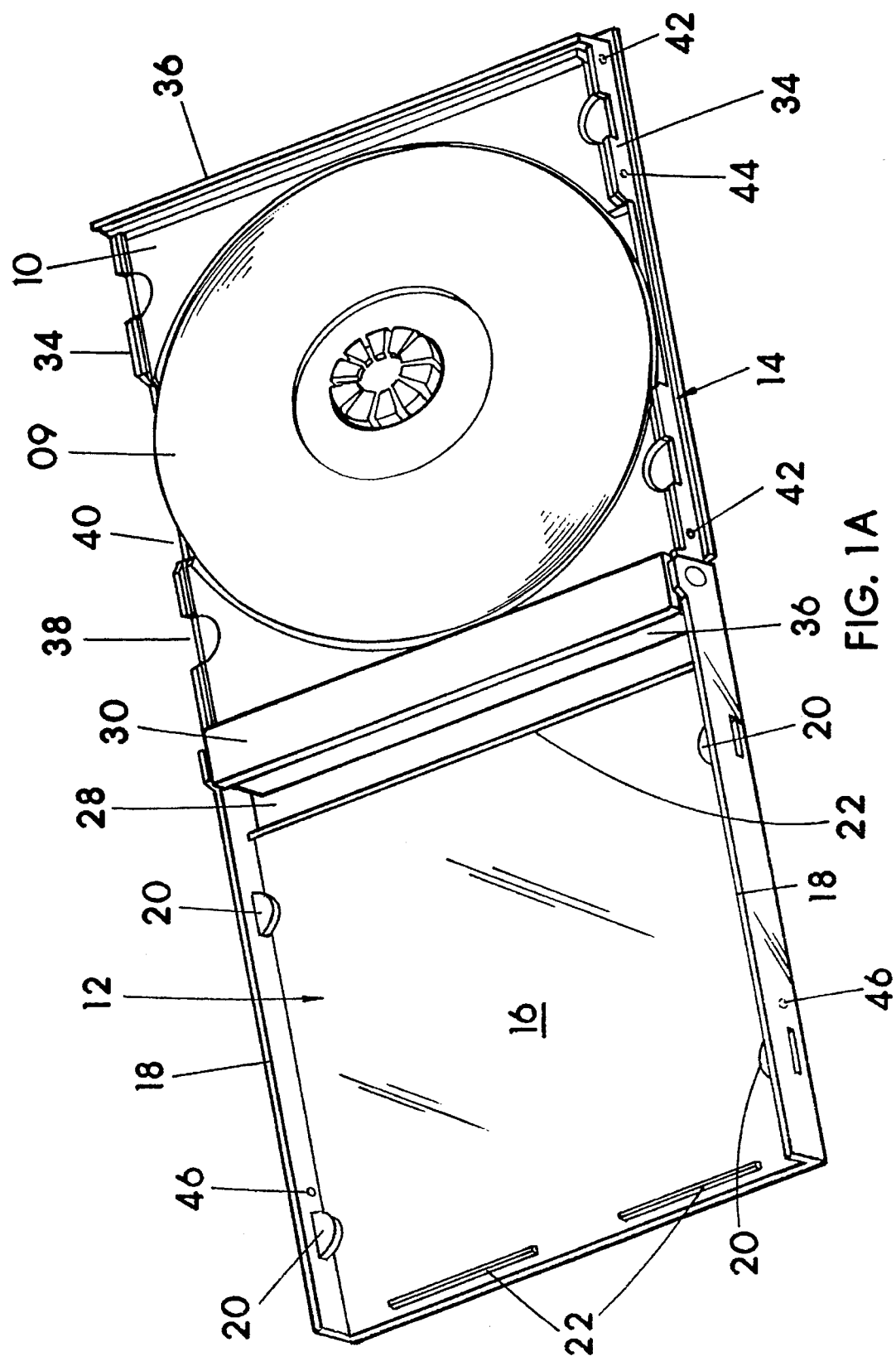
FIG. 1A shows the "standard" prior art CD jewel case for holding a single CD shown in the full open position and holding a CD on the center hub of a raised platform insert in the bottom half of the case. This drawing shows the "standard" single CD jewel case heretofore mentioned as essentially being the industry standard in the U.S. for a single CD stored in a rigid hinged-lid protective box.

A brief description of the prior art "standard" CD case for holding a single CD 09 will now be given, and although the case forming a component of the present invention does not need to be identical with respect to some of the described structural features of this "standard" prior art jewel case, the present invention may quite advantageously utilize the described prior art case less the raised platform 10 to increase interior space therein, and with the inclusion of additional structural features to be described. Thus, the present invention will be primarily described in relationship to the "standard" prior art case. As shown in FIGS. 1A, 1B and 1C, the prior art "standard" CD case for holding a single CD comprises a rectangular top half 12 and a rectangular bottom half 14 attached to one another with a hinging arrangement to be detailed. In the closed state, the "standard" prior art CD jewel case measures in exterior dimensions about 124 millimeters wide; about 140 millimeters long measured from the hinged side to the oppositely disposed side or edge; and about 10 millimeters thick. The thickness of the side walls and main panels of the case is about 1.3 millimeters. These measurements are approximate as measured by myself with measuring calipers from a "standard" jewel case, and are not taken from a manufacturing blue print of the case. The case is rectangular but not quite square, is fairly thin, and is designed to contain a compact disc 09 which is about 120 millimeters in diameter, and about 1.29 millimeters thick. Most if not all jewel case storage racks, displays and boxes structured to hold CD jewel cases are structured and sized to hold CD jewel cases of the approximate size as above described.

Top half 12 and bottom half 14 are made of plastics which are rigid and transparent. Top half 12 includes a substantially flat or planar main panel section 16 having relatively short side walls 18 parallel to one another and positioned on two oppositely disposed side edges of main panel 16, and extending perpendicular in the same direction from main panel 16. The short side walls 18 extend from what is considered the interior or back side of main panel 16 of top half 12. Connected to and extending perpendicularly from side walls 18 are four semi-circular tabs 20, two tabs 20 per each side wall 18. Tabs 20 on each side wall 18 are in spaced relationship to one another, and are positioned somewhat adjacent the terminal ends of side walls 18. Tabs 20 are positioned about one-third the distance up the height of side walls 18 from main panel 16 and extend outward toward the center axis of main panel 16 at about a parallel extension to the back planar surface of main panel 16. Side walls 18 are about 8.62 millimeters high. A space of about 2.5 millimeters is defined between the underside of each tab 20 and the interior or back side of main panel 16. This space is for inserting a CD information booklet into, (the booklet not shown because it is so well known) and tabs 20 serve as over hanging members against the back side of the booklet to assist in retaining the booklet in place against the back side of main panel 16 of top half 12 wherein the front of the booklet may be read through the transparent main panel 16 from the front side thereof. The booklet is contained within the case when the case is in the closed state. Additionally on the back side of main panel 16 extending parallel to the extension of tabs 20 and perpendicular to side walls 18 are two small ribs 22, one rib 22 along the forward edge shown as divided into two sections, and one continuous rib 22 along the rearward edge on the back side of main panel 16. Ribs 22 further assist in maintaining the CD booklet in place, as the booklet resides trapped between the side walls 18, tabs 20 and ribs 22. The booklet can be removed by flexing it and drawing it outward over the front rib 22, which is the rib 22 furthest from the hinged end of main panel 16.

The hinge attachment of top half 12 to bottom half 14 of the case is a structural arrangement including side walls 18 each extending about 13 millimeters beyond main panel 16 prior to terminating. On each of the extending portions of the side walls 18, on the same sides of the side walls as tabs 20 extending inward toward the center line axis of the main panel 16 is a knob 24, one knob 24 per side wall 18 extension. FIG. 1C is a fragmentary view of a portion of top half 12 showing a knob 24. The knobs 24 are used to engage holes 26 in the bottom half 14 of the case, wherein the knobs 24 snap into the holes 26 which are sufficiently large to allow the knobs 24 to axially rotate within the holes 26 and to thus allow pivotal movement of the top and bottom halves 12, 14 one-hundred and eighty degrees relative to one another so that the case may be taken from an open state to a closed state. Top half 12 inclusive of main panel 16, tabs 20, ribs 22, knobs 24 and side walls 18 are integrally formed of a single molded piece of plastics, which is transparent. The plastic material of top half 12, and bottom half 14 too, is considered rigid, but in sufficiently thin and/or un-braced areas such as the extending portions of side walls 18, the plastic is flexible and resilient, at least sufficiently so as to allow the extending portions of side walls 18 to be bent outward or spread slightly to allow the snapping of the knobs 24 into the holes 26 wherein the resiliency of the plastics retains the knobs 24 in the holes 26.

Figure 2:
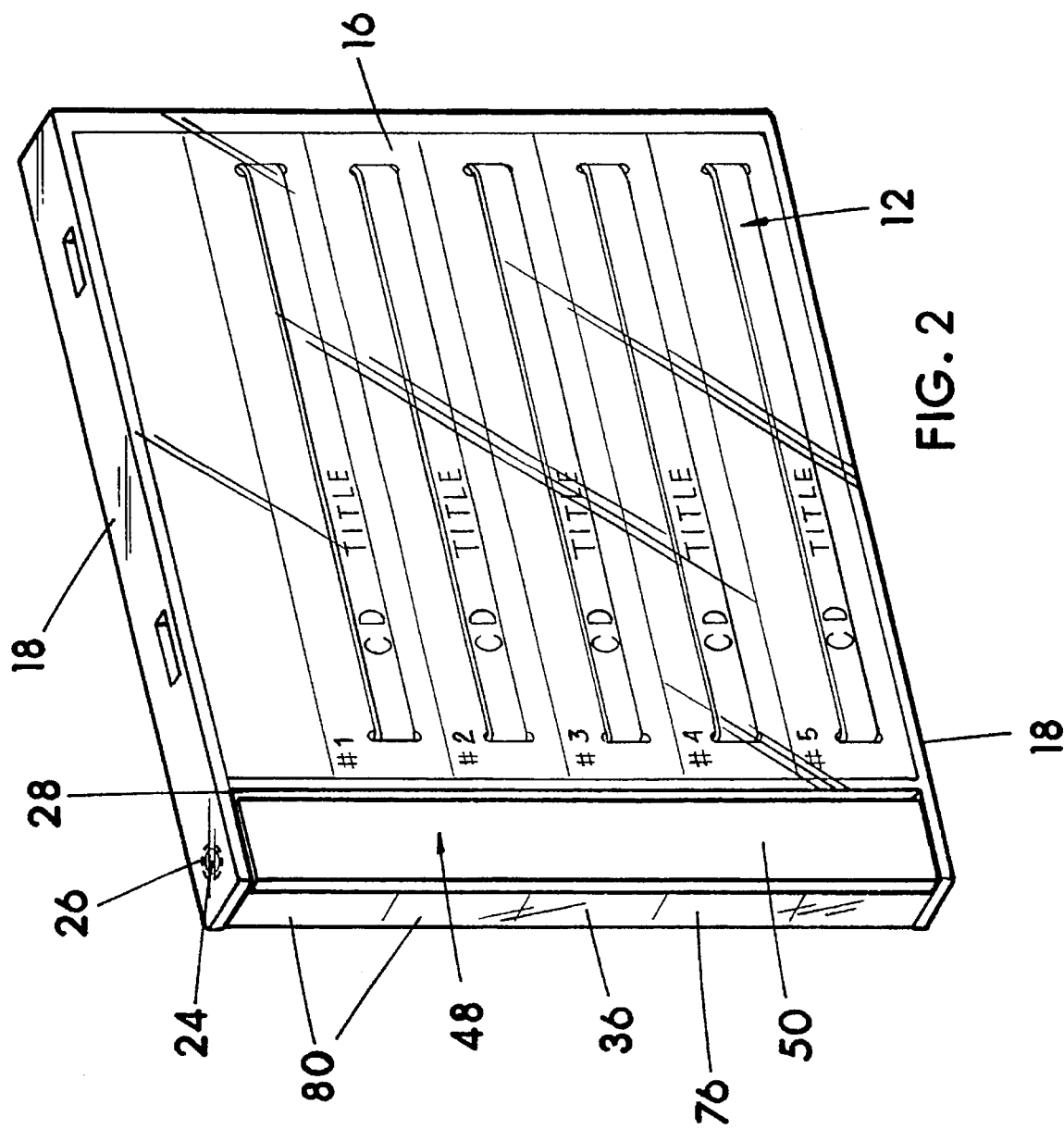
FIG. 2 shows an example of a case in accordance with the present invention in the closed position from a front perspective view. The "standard" prior art case of FIG. 1A also appears like this in the closed position.

Defined between the extending portions of side walls 18 of top half 12 is a relatively narrow open area or material relief 28 about 13 millimeters wide and essentially across the full width of the top half shown in FIG. 1A. This material relief 28 provides clearance to allow pivotal hinged movement of about 180 degrees between the top and bottom halves 12, 14, and when the case is in the closed state, is filled with an edgeward raised portion 30 of the raised platform 10 resulting in a case appearing as that of FIG. 2 wherein the raised portion 30 of the raised platform 10 lies flush or in the same plane as the outer front surface of main panel 16 of top half 12. FIG. 2 shows the present invention (case), but the prior art "standard" case currently being described appears substantially the same in the closed state from a front view.

The bottom half 14 of the prior art "standard" CD case for holding a single CD normally includes the raised platform 10 for holding a single CD 09 as shown in FIG. 1A. FIG. 1B shows bottom half 14 with raised platform 10 removed. Raised platform 10 in the standard CD jewel case is retained in the bottom half 14 of the case by a snap fit between knobs and holes, and thus can be removed at any time desired. As shown FIG. 1B, bottom half 14 includes a relatively large main panel 32 having a generally flat or planar front and back surface. Extending upward perpendicular from main panel 32 on the peripheral edges thereof are two oppositely disposed side walls 34 and two oppositely disposed end walls 36 which essentially define bottom half 14 as a shallow box-like structure. The two end walls 36 are located one adjacent the hinged side and the other straight across or oppositely disposed therefrom. When the case is in the closed state, side walls 18 of top half 12 fit over the outside and in close adjacency of the two correspondingly positioned side walls 34 of bottom half 14. The side walls 34 of bottom half 14 include four notches 38, two notches 38 per side wall 34 in the upper terminal edges thereof which are correspondingly placed and sized to allow the closing of top half 12 onto bottom half 14 wherein notches 38 provide space or open area in which tabs 20 rest. There are two notches 38 in spaced relationship on each of these side walls 34 of bottom half 14, and located between each of these pairs of notches 38 as seen in FIGS. 1A and 1B is a wider and deeper notch 40 which is designed to allow a person to grasp the side edges of a CD to pull it off of the raised platform 10 and from the open case. The shallow box-like structure of bottom half 14 is about 13 millimeters longer than the main body of top half 12, or about equal in length to the overall length of top half 12 including the extending portions of side walls 18 supporting the hinge knobs 24, and this simply provides bottom half 14 being fully underneath the material relief 28 of top half 12.

As briefly previously mentioned, the raised platform 10 which is not utilized in the present invention, snaps into bottom half 14 via two knobs (not shown) on each of two oppositely disposed lower side edges which snap into holes 42 in the side walls 34 in bottom half 14. As shown best in FIG. 1B, side walls 34 each include two holes 42 originally intended to be utilized to help retain raised platform 10 in place. Also shown well in FIG. 1B is another set of holes 44 in side walls 34, one hole 44 per side wall 34 and located straight across from one another. These holes 44 are utilized in combination with a set of knobs 46 located one on each of the side walls 18 of top half 12 so that when the case is closed the knobs 46 snap into the holes 44 to create a low friction lock preventing the case from simply falling open, or in other words, latching it closed.

The top or upper terminal edges of side walls 34 of bottom half 14, and the top or upper terminal edge of the end wall 36 adjacent the hinge side of bottom half 14 of the case are in part utilized to stabilize the edgeward raised portion 30 of raised platform 10, and likewise, the binder member 48 used as part of the present invention may also advantageously utilize these upper terminal edges of the side walls 34 and end wall 36 to be further stabilized as will be detailed.

Binder member 48 is in this example of the invention is structured to be utilized with the above described "standard" prior art jewel case or a case substantially similar thereto, although some of the structural features of the prior art case are not essential, the present invention will now be detailed as though the standard prior art case were the jewel case body or box being utilized as a component thereof. Thus, part numbers utilized in the description of the "standard" prior art jewel case will be used where applicable with reference to all of the drawing figures to describe the present invention. FIG. 2 is an example of a case in accordance with the present invention shown from a front perspective view wherein the case is in the closed state and a main or top panel 50 of binder member 48 is shown filling the material relief 28. This example uses top half 12, bottom half 14, the extending portion of side walls 18 having knobs 24 inserted into holes 26 in bottom half 14 to define a box of substantially equal exterior size and shape as the above described "standard" prior art CD jewel case. The top half 12 and bottom half 14 are hingedly attached with the knobs 24 and holes 26 so that the two members 12, 14 may be pivoted relative to one another between a closed state and an open state of the case. Preferably top half 12 and bottom half 14 are both made of rigid transparent plastics for strength, low cost manufacturing, and to allow viewing through the case members so to be able to read a spine label and a front label as will be detailed. In the present case, there is no need for raised platform 10, and thus it is either left out at the manufacturing plant, or removed by the consumer to render the interior of the case with additional space sufficient for holding up to five CDs, or four CDs and a front booklet depending upon the thickness of the booklet.

Figure 3:
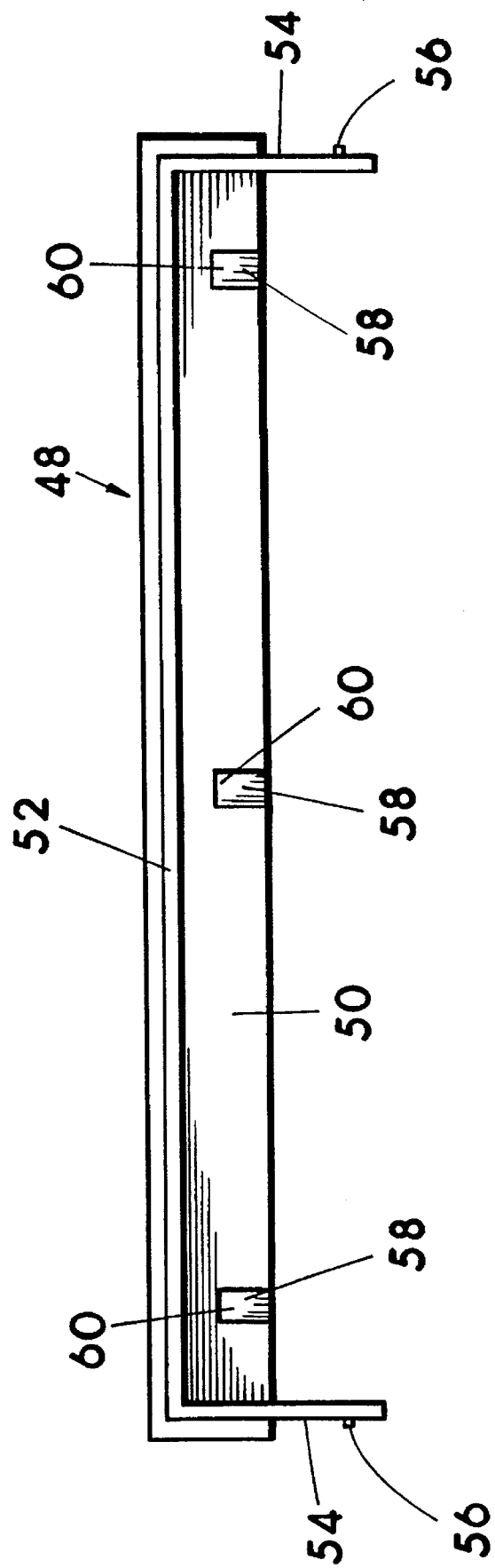
FIG. 3 shows the heretofore mentioned binder member from a bottom plan view.
Figure 4:
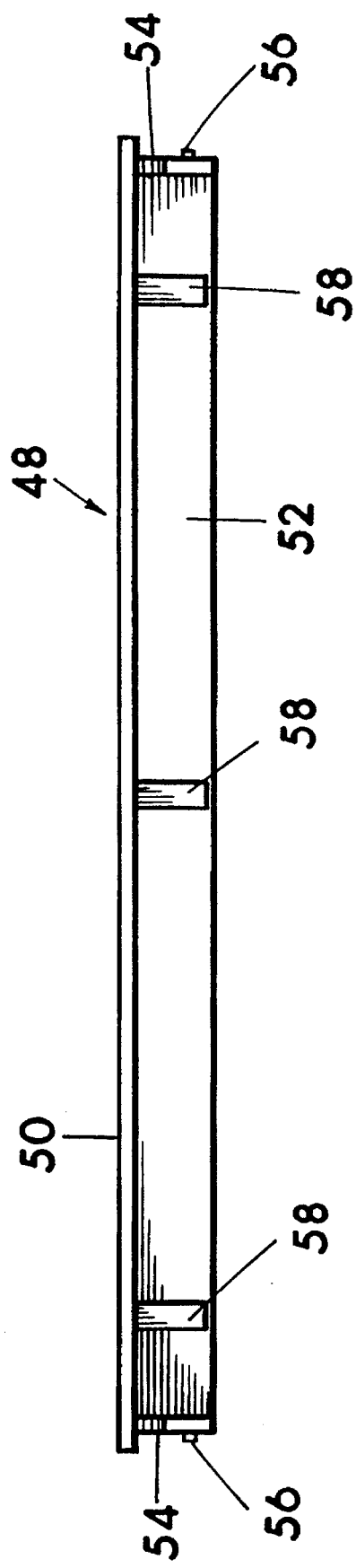
FIG. 4 shows the binder member from a front plan view.
Figure 5:
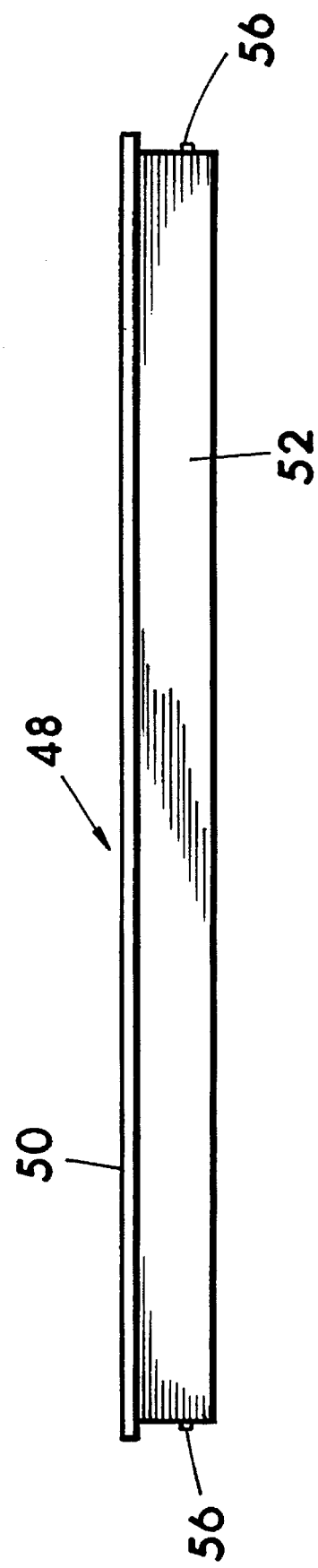
FIG. 5 shows the binder member from a back plan view.
Figure 6:
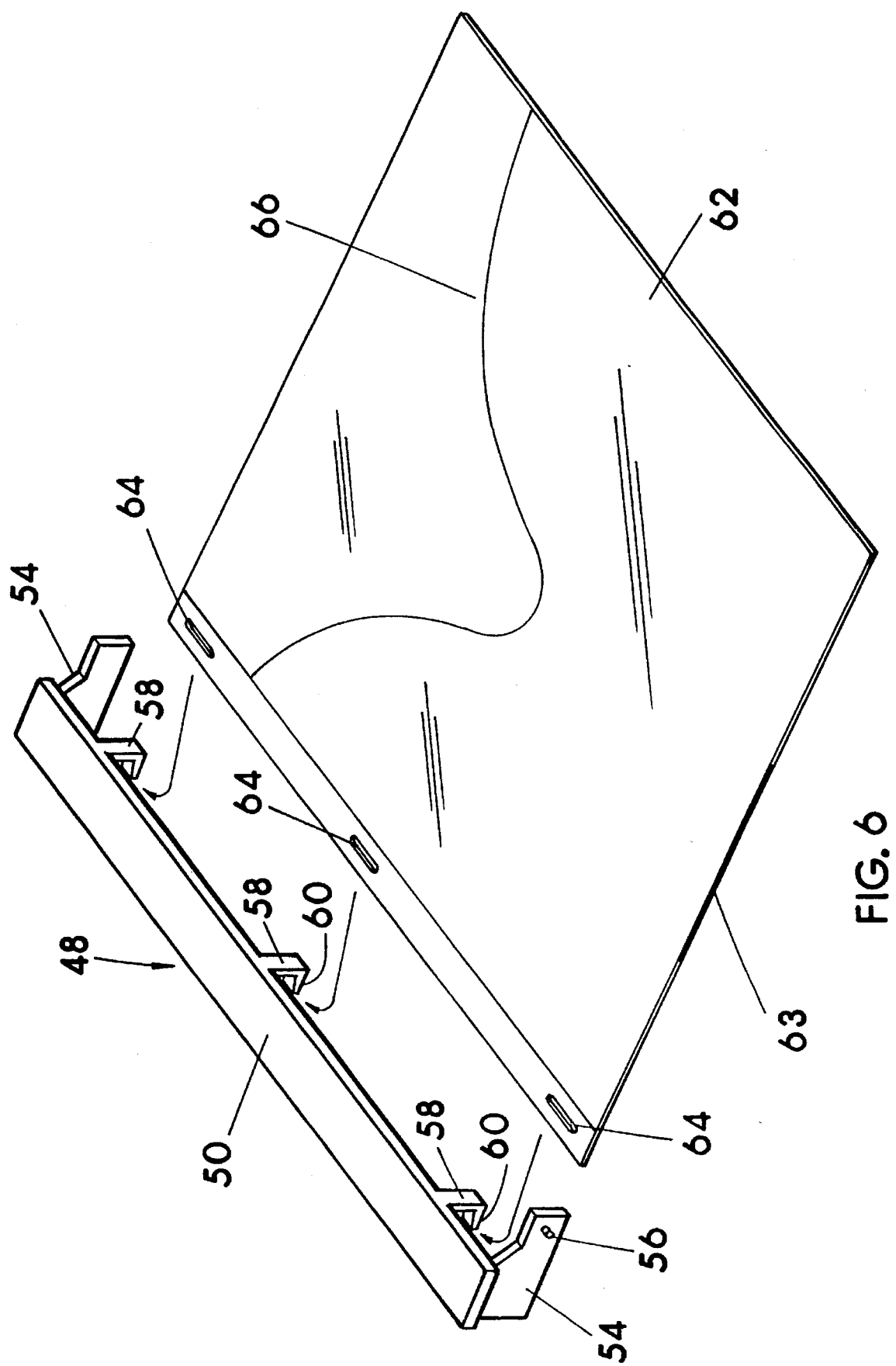
FIG. 6 shows the binder member from a left top front perspective view, and a heretofore mentioned sleeve for holding a CD is shown positioned ready for attachment to the downward extending members of the binder member.
Figure 8:
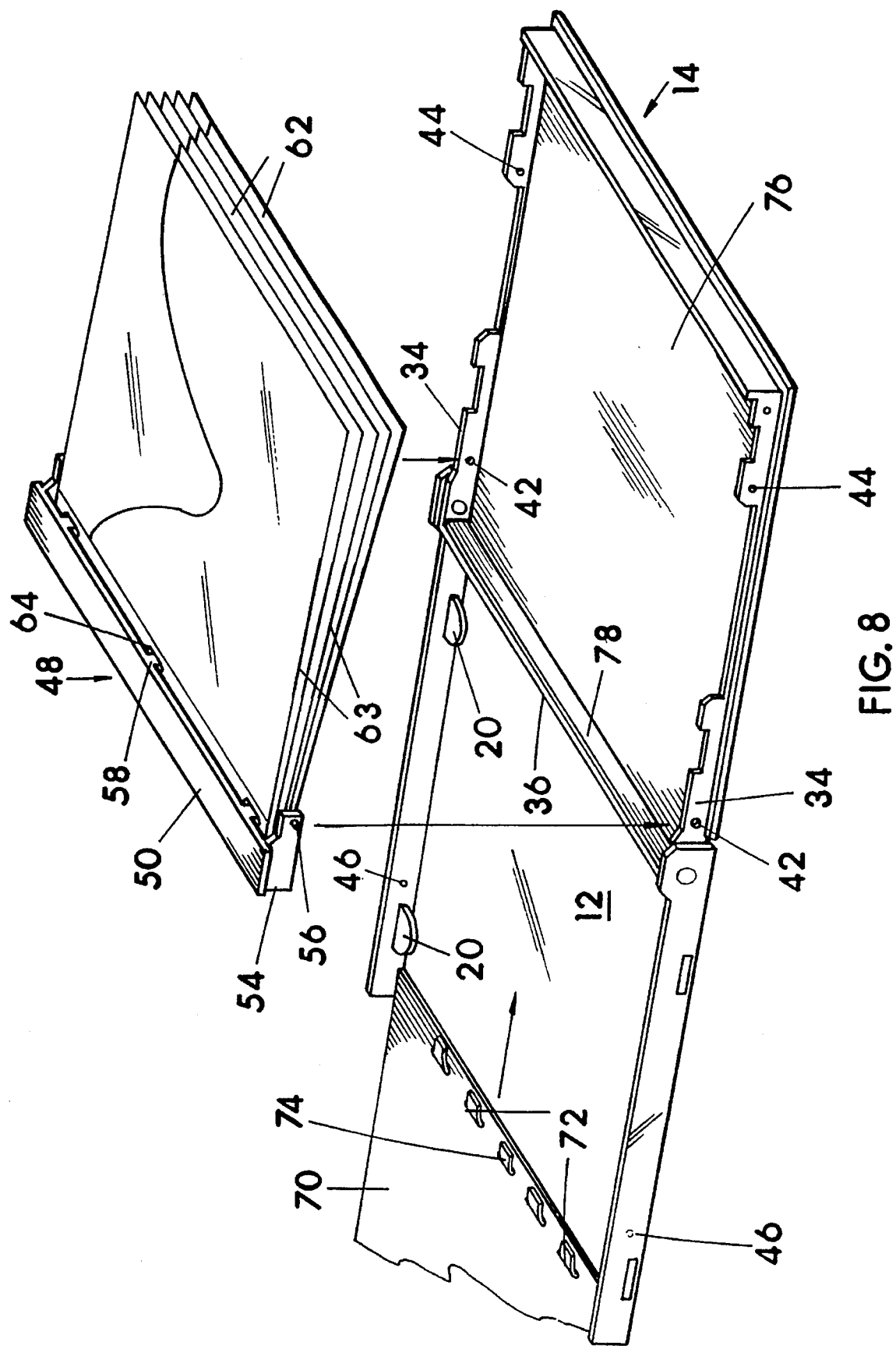
FIG. 8 shows the "standard" prior art style jewel case of FIG. 1A absent the bottom raised platform insert, and in the open position with the assemblage of FIG. 7 (less the CDs) positioned to be installed into the case.

FIG. 3 shows the elongated binder member 48 from a bottom plan view. The underside of the main or top panel 50 is shown, as well as an end wall 52 and two side walls 54, one side wall 54 on each opposite end of the top panel 50 and intersecting the terminal ends of end wall 52 at 90 degrees. Top panel 50 extends outward a short distance beyond side walls 54, and outward beyond end wall 52, and it is these extending portions of top panel 50 which will reside atop the terminal upper edges of end wall 36 and side walls 34 of bottom half 14, adjacent the hinged side of the case when assembled to in part stabilize binder member 48 within the case. The length of top panel 50 of binder member 48 is slightly less than the space between the extending portions of side walls 18 supporting knobs 24 of top half 12 or is about equal to the distance between side walls 34 measured from the outside to the outside thereof so that the case can be closed without interference. Binder member 48 when installed in the case is considered to reside in the left hand side of the case and the sleeves 62 holding CDs which will be detailed, reside primarily to the right of binder member 48 within the case. End wall 52 of binder member 48 resides inside or inboard of the left hand end wall 36 of bottom half 14, and closely adjacent thereto. Side walls 54 extend downward to rest upon the interior surface of main panel 32 of bottom half 14 while the extending portions of top panel 50 on the ends and above the left hand end wall 36 are resting on the terminal upper edge of end wall 36 and side walls 34 as may be ascertained from FIG. 2, and with such contact in wide spread area, binder member 48 is quite stable when fitted into bottom half 14. Side walls 54 extend outward beyond the width of main panel 50 toward the right hand end wall 36 as shown in FIGS. 3 and 8, and the bottom terminal edge of the side walls 54 and end wall 52 may rest against the back or interior surface of main panel 32 for further stability of binder member 48. Side walls 54 fit inside or inboard of side walls 34 and parallel thereto, and an outward extending knob 56, one knob 56 on each side wall 54 snaps into the hole 42 in side walls 34 of bottom half 14. Side walls 54 are made of rigid plastics, but are able to be flexed or bent inward to allow the knobs 56 to be snapped into the holes 42 wherein the resiliency of the plastics retains the knobs 56 and the overall structure of binder member 48 in place in bottom half 14. To remove binder member 48 from bottom half 14, top panel 50 may be pulled upon, but preferably, side walls 54 are pressed inward at the upper exposed edges with the fingers to disengage knobs 56 from hole 42. When binder member 48 is properly installed, it is adjacent the hinge side of the case, and the top panel 50 fills the material relief 28. Attached to, and preferably by integral molding of the entire structure of binder member 48 from rigid or semi-rigid plastics, are three spaced apart downward extending members 58. "Downward" with reference to extending members 58 refers to the members 58 depending and extending from the under far right side of top panel 50 toward the interior surface of main panel 32 of bottom half 14. Just prior to or at the point of contact with main panel 32, extending members 58 turn 90 degrees to define a horizontal foot 60, one foot 60 per member 58, extending parallel to main panel 32 and toward end wall 52. The feet 60 terminate prior to engaging end wall 52 so sleeves 62 having side edges with apertures 64 may be hooked over feet 60 to connect the sleeves 62 to extending members 58. Once sleeves 62 are connected via apertures 64 to extending members 58, and binder member 48 is snapped in bottom half 14, sleeves 62 cannot disconnect due to extending members 58 being too near or even against the interior surface of main panel 32, thus rendering sleeves 62 retained in place until binder member 48 is removed from bottom half 14, which is the procedure for adding or subtracting sleeves 62 relative to binder member 48 and the case. Feet 60 may not be required provided members 58 extend to sufficiently close in proximity to prevent the unwanted "slipping" out of sleeves 62.

Figure 7:
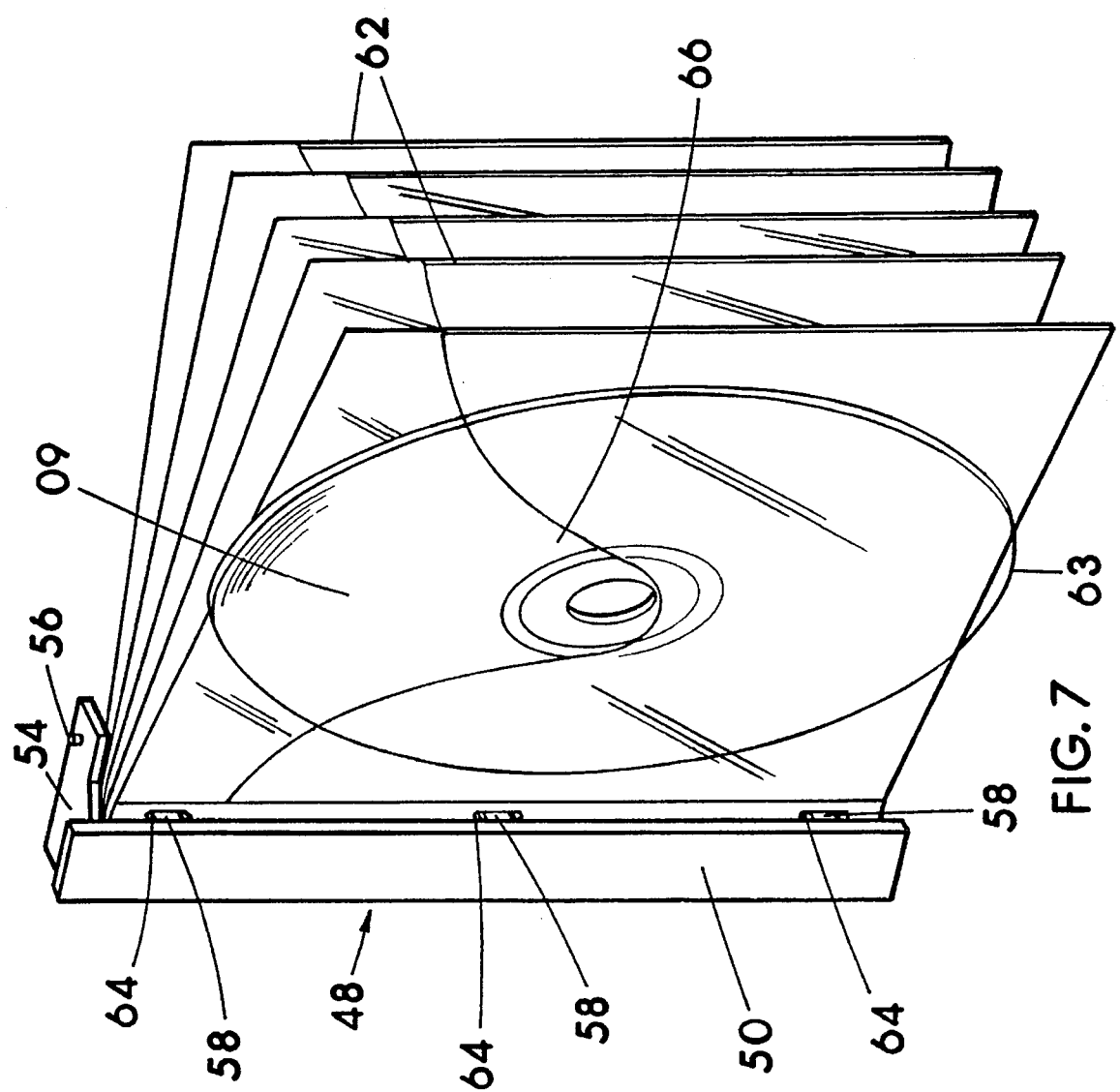
FIG. 7 shows the binder member from a top front perspective view with five sleeves hooked onto the extending members of the binder member, and each sleeve holding a CD. The sleeves are shown with an access opening notched downward to the center for allowing finger access to the center hole of the CD.

Up to five sleeves 62 containing and protecting five CDs, front label card 70 and back or spine label insert 76 may be contained in a "standard" jewel case depth without raised platform 10, and thus extending members 58 are sufficiently long to accommodate the thickness of the edges of the five sleeves 62, or the edges of sleeves 62 must be sufficiently thin. As may be ascertained from FIGS. 7 and 8, the sleeves 62 and CDs contained in the sleeves reside to the right hand side of the relatively narrow elongated binder member 48 in a stacked stored position.

Sleeves 62 are thin rectangular envelopes defined of top and bottom panels or sheets seamed or heat sealed on three edges to one another, and each sleeve 62 is open at the top end where the top and bottom panels are not seamed together to allow insertion and removal of at least one CD per sleeve. The sleeves 62 are best used with only one CD in each sleeve or sleeve pocket, thereby the CDs are not directly against each other and are thereby better protected, although one could actually fit 2 to 3 CDs in a single sleeve 62, even through the fit is a little tight. The sleeves 62 are most preferably a transparent plastic to allow reading of the CD label through the sleeve. The sleeves 62 each preferably have a notch or finger recession 66 on at least one side thereof extending from the open top downward to where the center opening of a contained CD resides, and this to allow insertion of a finger into the center opening of the CD during insertion and removal thereof relative to the sleeve so that the information bearing portion of the disc need not be touched. Sleeves 62 are sized in exterior dimension to fit within the jewel case between side walls 34, and since standard size CDs typically extend slightly beyond the interior edges of side walls 34 through notches 40 as may be seen in FIG. 1A, each sleeve 62 preferably includes a slit 63 in the center bottom of about 1.75 inches long, but this length could be varied. Slit 63 allows the bottom center of the CD to extend a short distance through the sleeve 62, while the top center of the CD extends slightly beyond the oppositely disposed open top of the sleeve 62 as may be seen in FIG. 7, and thereby the CD fits into and is centered in the case. The sleeves 62 are flexible or posses a flexible component, at least along the one side edge thereof having the apertures 64 to allow flipping or the bending up and down of the sleeves to allow browsing through CDs in the case much like pages of a book. The sleeves 62 are large enough in the interior to contain a CD, and small enough in exterior dimensions to fit completely within bottom half 14 primarily to the right of binder member 48 between side walls 34 and end wall 36 with the case in the closed state. The use of multiple extending members 58 in spaced relationship to one another and in conjunction with multiple apertures 64 in spaced relationship to one another and appropriately placed for placement over members 58 provides lateral stability to the retained sleeves 62 when flipping through the sleeves, which is lifting them upward out of bottom half 14 to select a CD, although I have considered a centrally positioned single elongated extending member somewhat equivalent to members 58 inserted through a single elongated aperture 62 might also provide sufficient lateral stability. Again, if a booklet of substantial thickness is inserted in top half 12, such as a booklet having 5 or 6 pages depending upon the page thickness, one or more sleeves 62 and or CDs may need to be removed in or to fully close the case, and this might result in the case only holding four CDs since the CDs reside stacked one upon the other in sleeves 62 beneath the booklet or booklet area when in the stored position, much like the pages of a closed book.

Figure 10:
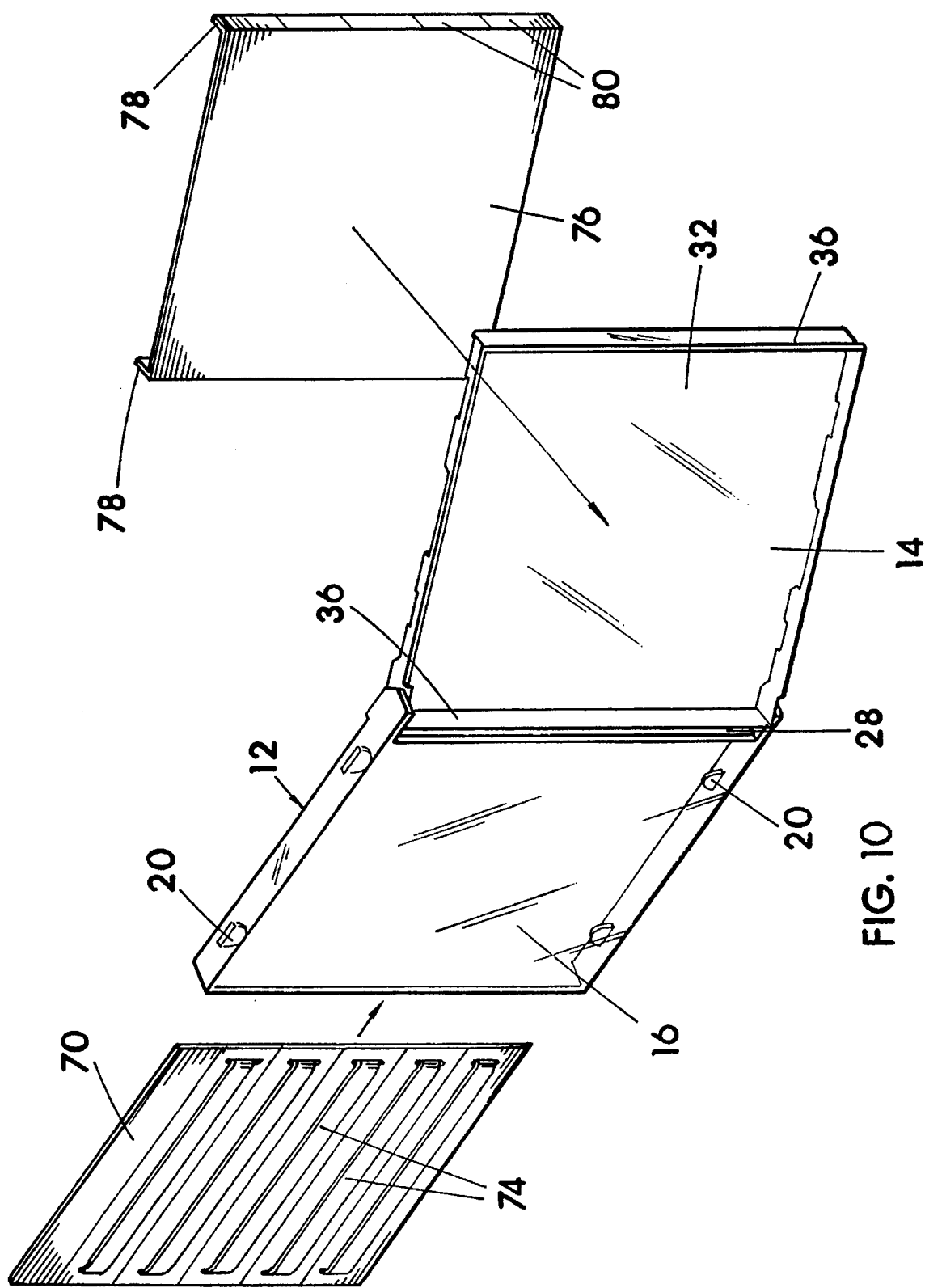
FIG. 10 shows from the back side the "standard" prior art style jewel case of FIG. 1A absent the bottom raised platform in the open position with the label card ready for insertion into what is the top half of the case. Additionally, a spine label insert is shown positioned for insertion into the bottom half of the case.

As previously briefly mentioned, it is desirable to be able to identify the contents of the case and its four or five CDs therein through the case spine, the spine being one or both of the end walls 36 of bottom half 14. Since the "standard" CD case includes a paper insert printed with information identifying the single contained CD through both transparent side walls 36, and this prior art insert is shaped as that shown in FIG. 10, I propose providing a card insert 76 having two oppositely disposed up-turned edges or side walls 78 which may be written upon with a pen, pencil or the like, and the writing will show through the end walls 36. The side walls 78 are positioned on the oppositely disposed edges of a main panel of the card 76, and are defined by a fold to create the up-turned sides which are about the same height as end walls 36. The side walls 78 may be pre-printed or divided into five sections with lines to define five boxes 80, and the end user can write in the defined boxes 80 the contents of the case. The card insert 76 is inserted into the interior of bottom half 14 and fits snugly therein, and then binder member 48 and sleeves 62 are installed in the case, and binder member 48 positively prevents card 76 from falling out of the open case. Card 78 can be removed and replaced or the writing altered via removing binder member 48 and sleeves 62. Card 78 allows the case to stored in any of the jewel case storage racks with a spine side facing outward, and the user can read the spine label to determine whether the sought after disc is in that particular case without having to pull the jewel case out of the storage rack or box.

Figure 9:
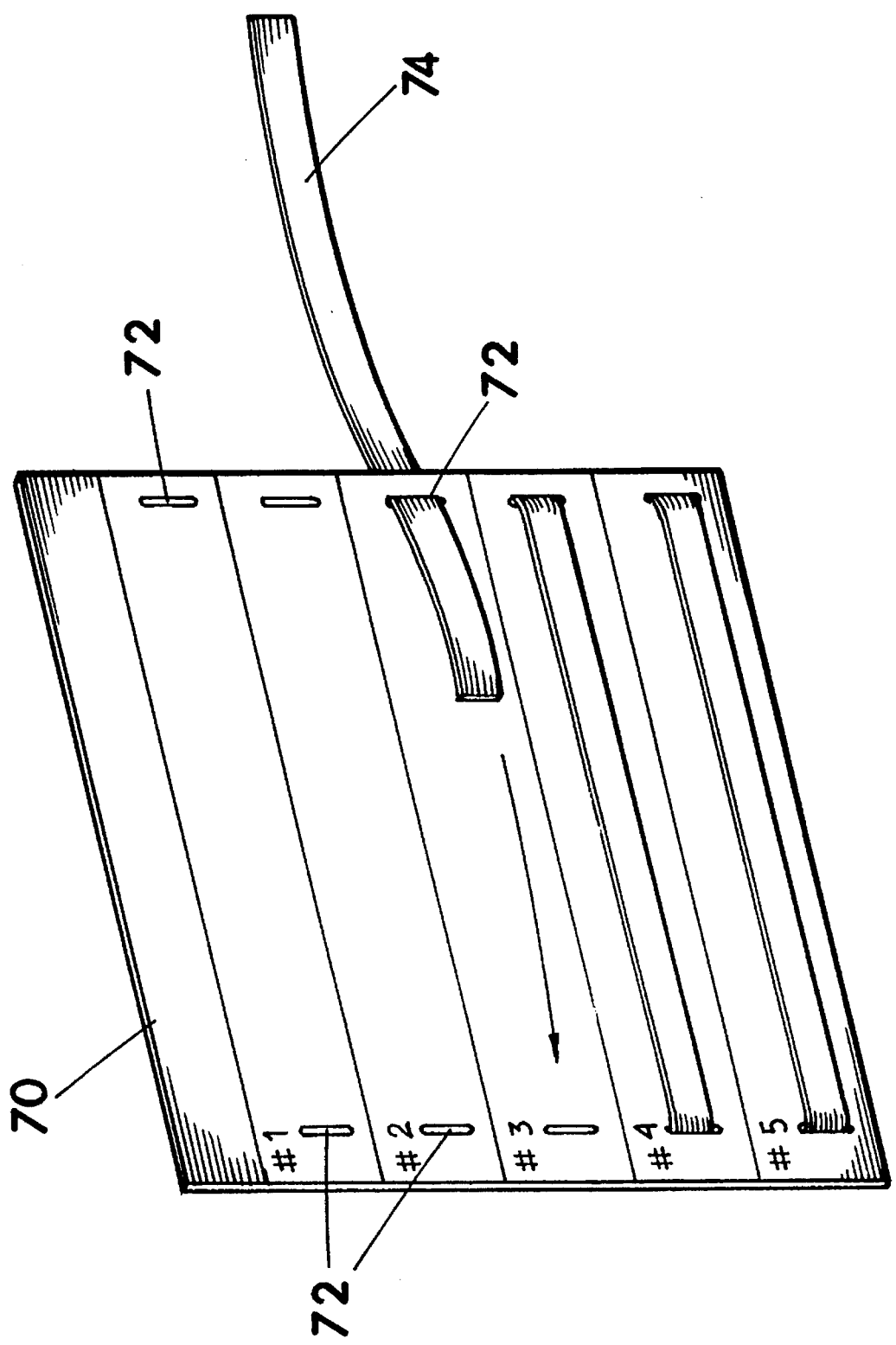
FIG. 9 shows a label sheet for describing the content of five CDs for display in the front booklet window of the present jewel case.

It is evident that the boxes 80 of the spine label (card 78) do not provide a great abundance of space in which to identify the contents of a particular disc. The box 80 may identify the artist for example, but there may not be sufficient space for additional information such as album title and the like. For additional labeling space or space for additional data, I propose use of a data card 70 shown in FIGS. 8, 9 and 10. Data card 70 replaces a booklet under tabs 20, or at least it is placed in this area so it may be read through the transparent plastic of main panel 16 of top half 12. Data card 70 may be retained via being slipped under tabs 20 and between the ribs 22 and would be sized appropriate therefore. Data card 70 should be relatively thin, and if made sufficiently thin as I have been able to do in developing my invention, the jewel case will be able to contain five CDs in sleeves 62 along with card 78. Data card 70 could be a paper card wherein the user writes the appropriate information thereon much like that of card 70, however, as shown in the drawings, the card 70 could be structured to accept elongated narrow strips of information bearing material such as paper for example. These strips, henceforth referred to a label strips 74 may be the spine labels of existing pre-printed CD jewel case labels. For example, existing "standard" jewel cases sold with a CD therein will have a pre-printed card somewhat equivalent to my card 78, and this pre-printed card includes the two short up-turned side walls for identifying the CD through the spine of the case. The side walls of these existing pre-printed spine cards are up-turn with a sharp 90 degree bend, and in most cards the bend or fold is actually created by a series of small perforations in conjunction with the fold. Thus, this spine label side walls of the spine card of the "standard" CD case can be easily torn off of the main body of the card, or in the very least, since they are made of paper, they can be cut off with a pair of scissors or a knife. The present card 70 include apertures or slits 72 to receive label strip 74 which may be these cut or torn off spine labels from the spine label card of other standard CD jewel case. Label strips 74 may be provided as blank strips to be written upon. In either situation, card 70 preferably includes ten slits 72, five slits 72 on two oppositely disposed side edges of the card placed one above the other in two vertical rows as shown in FIG. 9. The first vertical row of five slits 72 is in spaced relationship to the second vertical row, and the rows of slits 72 are about 100 millimeters apart from one another so that a label strip 74 of about 110 millimeters in length may be inserted through two aligned slits 72 of the two different rows as shown in FIG. 9, wherein three or four millimeters of the strip 74 is left on the back side of the card 70 as may be ascertained from FIG. 8 to retained the strip 74 in place. The strips 74 are first inserted from one side of the card 70 and brought through the opposite side of the card, similar to weaving, so that the printed upon side of the strip 74 will shown through the transparent front of the case as shown in FIG. 2. For further assistance in locating and retrieving a desired CD, I prefer the card 70 to have a printed number system as shown in FIGS. 2 and 9 adjacent the strips 74 or the area to be written upon, wherein number 1 would be the first sleeve 62 and number 2 would be the second sleeve 62 and so on when you opened the case to retrieve a CD of your choice.

Although I have very specifically described the preferred structures and use of the invention, it should be understood that some changes in the specific structures described and shown in my drawings may clearly be made without departing from the true scope of the invention in accordance with the appended claims.

What I claim as my invention is;

1. A case for storing at least four compact discs, said case comprising;

a substantially rigid top case member and a substantially rigid bottom case member attached to said top case member by hinge means for allowing relative pivotal movement of the top and bottom case members between an opened state and a closed state of said case, said case having an interior storage area defined between the top and bottom case members when said case is in the closed state; said storage area being accessible with said case in the opened state;

an elongated and narrow binder member removably connected within said case, said binder member removably connected via a frictional resistance fit between said binder member and said case; at least one extending member depending from an underside of said binder member toward a main panel of said bottom case member;

at least one flexible substantially thin and flat sleeve suitably sized for storing compact discs therein, said at least one sleeve including at least one access opening for allowing insertion and removal of compact discs relative to said at least one sleeve; a first edge of said at least one sleeve connected to said extending member of said binder member so that in a stored position said at least one sleeve rests within said storage area and generally to one side of said binder member within said case; said at least one sleeve being sufficiently flexible at least along said first edge to allow bending thereof to such a degree as to allow moving of said at least one sleeve from the stored position within said case outward to allow access to said access opening when said case is in the opened state; said storage area being sufficiently deep within said case in the closed state to allow storage of at least four compact discs.

2. A relatively thin rectangular case for protectively and compactly storing at least four information-bearing compact discs, said case comprising a substantially rigid top case member and a substantially rigid bottom case member attached to said top case member by hinge means for allowing relative pivotal movement of the top and bottom case members between an opened state and a closed state of said case;

said case having an interior storage area defined between the top and bottom case members when said case is in the closed state; said storage area being accessible with said case in the opened state;

a binder member removably engaged within said bottom case member adjacent said hinge means; said binder member removably engaged and in-part stabilized within said bottom case member by way of a disconnectable snap-fit engagement between extending knobs one on each of two oppositely disposed ends of said binder member and apertures one in each of two oppositely disposed side walls of said bottom case member; said binder member further stabilized within said bottom case member by a peripheral edge flange of a main panel of said binder member resting upon said two oppositely disposed sides walls;

said main panel of said binder member having a top surface positioned within a material relief in said top case member adjacent said hinge means and defining a portion of a front exterior surface of said case with said case in the closed state;

multiple extending members extending from an underside of said main panel of said binder member toward an interior bottom surface of said bottom case member;

at least four flexible substantially thin and flat sleeves each suitably sized for storing at least one compact disc therein, each of the sleeves including at least one access opening for allowing insertion and removal of a compact disc relative to the sleeve; connecting means associated with a first edge of each of the sleeves and said multiple extending members of said binder member connecting the sleeves to said binder member so that in a stored position the sleeves rest stacked upon one another primarily within said bottom case member and between the side walls thereof; the sleeves being sufficiently flexible at least along said first edge adjacent said multiple extending members to allow bending thereof to such a degree as to allow moving of the sleeves upward from the stacked stored position within said bottom case member outward beyond the side walls thereof to allow access to said access opening of each of the sleeves when said case is in the opened state.

3. A relatively thin rectangular case for protectively and compactly storing at least four information-bearing compact discs, said case comprising a substantially rigid and transparent top case member and a substantially rigid and transparent bottom case member attached to said top case member by hinge means for allowing relative pivotal movement of the top and bottom case members between an opened state and a closed state of said case;

said case having an interior storage area defined between the top and bottom case members when said case is in the closed state; said storage area being accessible with said case in the opened state;

a binder member removably engaged within said bottom case member adjacent said hinge means; said binder member removably engaged and in-part stabilized within said bottom case member by way of a disconnectable snap-fit engagement between extending knobs one on each of two oppositely disposed ends of said binder member and apertures one in each of two oppositely disposed side walls of said bottom case member; said binder member further stabilized within said bottom case member by a peripheral edge flange of a main panel of said binder member resting atop said two oppositely disposed sides walls;

said main panel of said binder member having a top surface positioned within a material relief in said top case member adjacent said hinge means and defining a portion of a front exterior surface of said case with said case in the closed state;

multiple extending members extending from an underside of said main panel of said binder member toward an interior bottom surface of said bottom case member;

at least four flexible substantially thin and flat sleeves each suitably sized for storing at least one compact disc therein, each of the sleeves including at least one access opening for allowing insertion and removal of a compact disc relative to the sleeve; apertures within a first edge of each of the sleeves with said multiple extending members of said binder member inserted through said apertures and securing said sleeves to said binder member so that in a stored position the sleeves rest stacked upon one another primarily within said bottom case member; the sleeves being sufficiently flexible at least along said first edge adjacent said multiple extending members to allow bending thereof to such a degree as to allow moving of the sleeves from the stacked stored position within said bottom case member outward to allow access to said access opening of each of the sleeves when said case is in the opened state;

first identification means removably secured against a back interior surface of the transparent top case member and visible therethrough for identifying compact discs within said case through said front exterior surface of said case with said case in the closed state;

second identification means removably secured against a back interior surface of a transparent spine side wall of said bottom case member adjacent said hinge means and extending perpendicular between said two oppositely disposed side walls, said second identification means for identifying compact discs within said case through said transparent spine side wall with said case in the closed state.

\* \* \* \* \*